United States Patent [19]

Rist

[11] 3,853,207
[45] Dec. 10, 1974

[54] BRAKE WITH BRAKING MEMBER HAVING A RING, ESPECIALLY FOR AUTOMOBILE VEHICLES

[75] Inventor: Michel Rist, Boulogne, France

[73] Assignee: Societe Anonyme Francaise du Ferodo, Paris, France

[22] Filed: Feb. 12, 1973

[21] Appl. No.: 331,378

[30] Foreign Application Priority Data
Feb. 16, 1972 France ............................. 72.05123

[52] U.S. Cl. .................... 188/76, 188/331, 192/73
[51] Int. Cl. .................... F16d 53/00, F16d 51/22
[58] Field of Search ....... 188/70, 76, 327, 331, 333, 188/106 F, 328, 336, 73.3; 192/73, 65

[56] References Cited
UNITED STATES PATENTS

| | | | |
|---|---|---|---|
| 2,046,420 | 7/1936 | LaBrie | 188/331 |
| 2,114,672 | 4/1938 | Bertrand | 188/328 |
| 2,186,834 | 1/1940 | Main | 188/331 |
| 2,783,858 | 3/1957 | Murphy | 188/76 |
| 3,098,545 | 7/1963 | Murphy | 188/76 |
| 3,291,262 | 12/1966 | Rosanowski et al. | 188/73.3 |
| 3,357,525 | 12/1967 | Francois | 188/76 |
| 3,368,647 | 2/1968 | Laverdant | 188/73.3 |
| 3,517,782 | 6/1970 | Hayes | 188/345 |
| 3,612,226 | 10/1971 | Pauwels et al. | 188/73.3 |

Primary Examiner—George E. A. Halvosa
Attorney, Agent, or Firm—Young & Thompson

[57] ABSTRACT

The invention relates to a brake of the type comprising a fixed support and a rotating member to be braked, said member having a ring provided with an internal braking track and an external braking track, and further comprising two braking plates arranged one on each of the ring and adapted to act respectively in association with the internal and external braking tracks, the plates being actuated by a stirrup floatably mounted on the fixed support, and comprising operators for gripping the said ring, and further comprising two brake jaws supported and articulated on the said fixed support for application against one of the braking tracks of the ring. A first operator contained in the stirrup and acting directly on one of the plates and indirectly on the other is hydraulic, while a second operator acting on the brake jaws is mechanical.

6 Claims, 14 Drawing Figures

FIG. 3
FIG. 4
FIG. 5
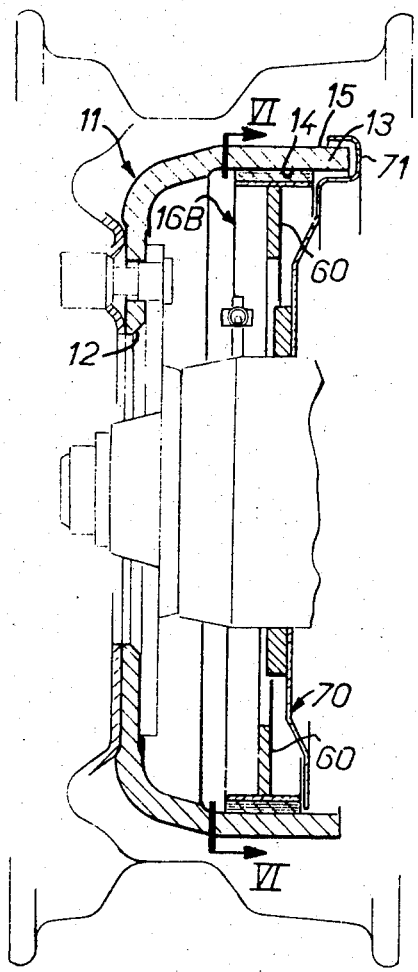
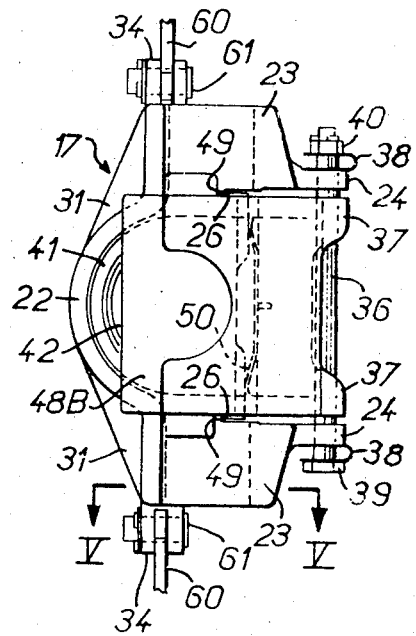

BRAKE WITH BRAKING MEMBER HAVING A RING, ESPECIALLY FOR AUTOMOBILE VEHICLES

The present invention relates generally to brakes comprising a fixed support and a member to be braked and having a ring, and is more particularly but not exclusively directed to such of said brakes as are intended to equip automobile vehicles.

More generally, the invention has for its object a brake of this kind, characterized in that it comprises two braking plates arranged on each side of the said ring and a C-shaped stirrup engaged on the said plates and on the said ring, the said stirrup being slidably and pivotally mounted on the support and containing an operating means adapted to act directly on one of the said plates and indirectly on the other, through the intermediary of the stirrup, for gripping the ring.

This sliding and pivotal mounting of the stirrup on the fixed support advantageously allows this support to follow a possible deformation of the ring on which it is engaged to a cone, due for example to the thermal stresses to which the said ring is subjected.

The objects, characteristic features and advantages of the invention will furthermore be brought out in the description which follows below, given by way of example, reference being made to the accompanying diagrammatic drawings, in which:

FIG. 3 is another view in cross-section, taken along the line III—III of FIG. 1;

FIG. 4 is a partial side view taken in the direction of the arrow Iv of FIG. 1 of the brake according to the invention, in which the member to be braked is assumed to be removed;

FIG. 5 is a partial view in cross section taken along the line V—V of FIG. 4;

Figure 1:
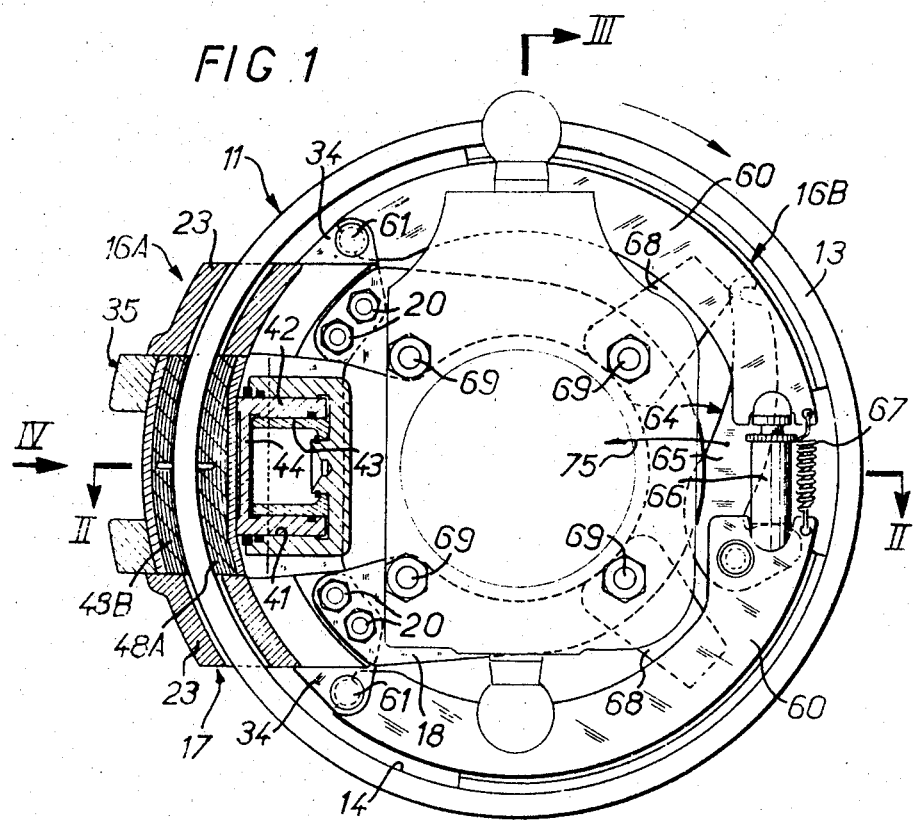
FIG. 1 is a view, partly in cross-section taken along the line I—I of FIG. 2, and partly in elevation with the protecting hood removed, of a brake in accordance with the invention.

In accordance with the form of embodiment shown in FIGS. 1 to 8, the brake according to the invention comprises a member 11 to be braked, having the general shape of a bowl, in the bottom of which is formed an opening 12 for the passage of the stub axle of a wheel to be braked, and which is intended to be fixed by this bottom on the rim of a wheel of this kind.

The free edge of this bowl forms a ring 13 having an internal track 14 and an external track 15.

With this ring 13 is associated a first clamping means which has been given the general reference 16A.

This clamping means comprises a fixed support 17 having the general shape of an H and adapted to be fixed, for example by screws 20, to a member 18 which has the general shape of a horseshoe and which forms part of the stub-axle of the wheel to be braked.

Figure 8:
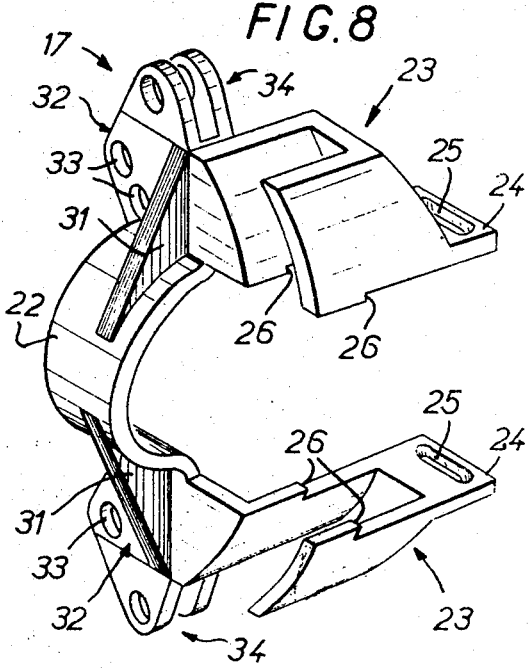
FIG. 8 is a diagrammatic view in perspective of one of the constituent parts of the fixed support of the brake according to the invention.

The support 17 is shown separately in FIG. 8.

Figure 6:
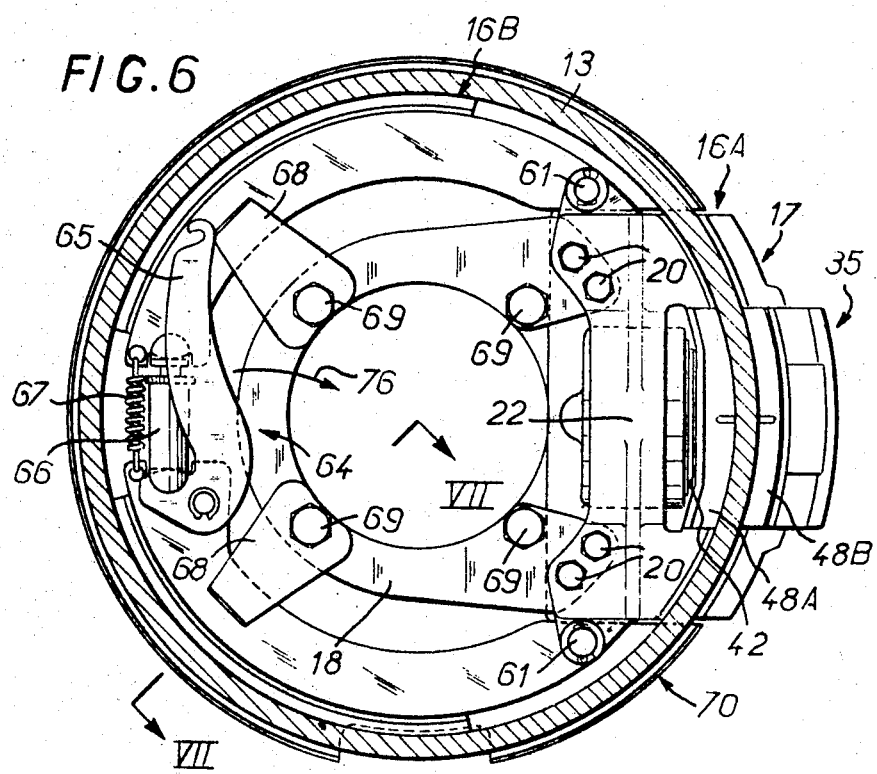
FIG. 6 is a view in cross-section of the brake according to the invention, taken along the line VI—VI of FIG. 3.

It comprises a central bar 22 which is curved as shown in FIGS. 6 and 8.

On one side of this central bar, the legs 23 of the support 17 are in the form of a hook (FIGS. 5 and 8) and are engaged on the exterior on the ring 13 of the member 11 to be braked (see FIGS. 1 and 6).

Figure 9:
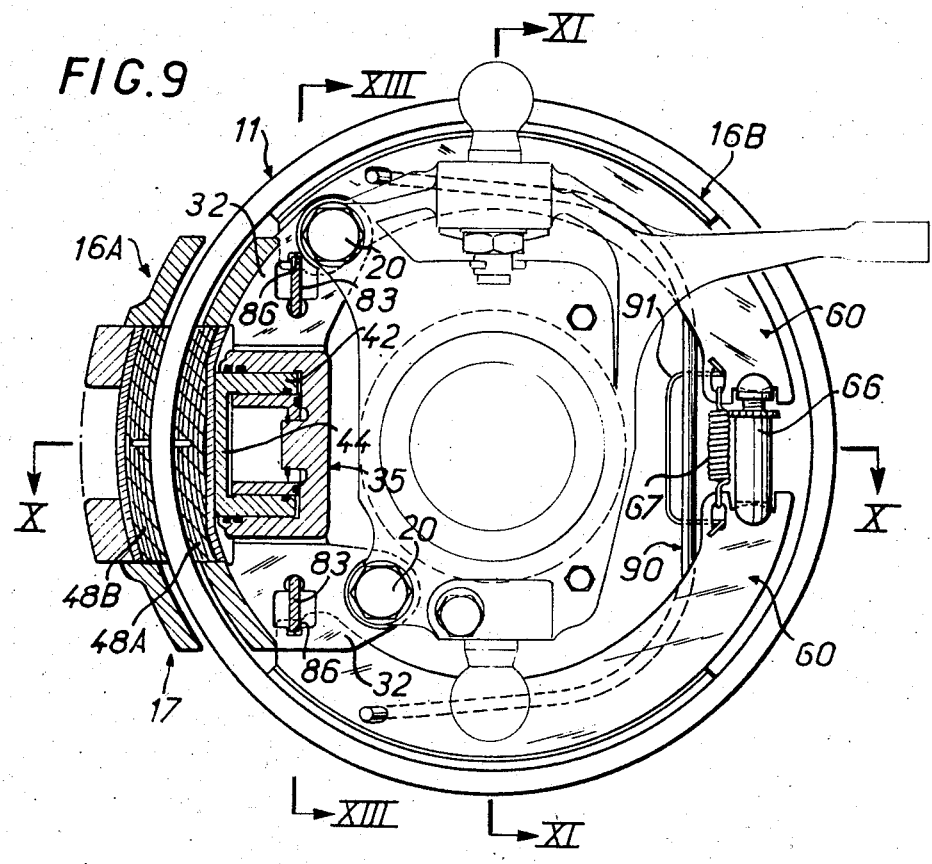
FIGS. 9, 10 and 11 are respectively similar to FIGS. 1, 2 and 3, and relate to an alternative form of construction.
Figure 10:
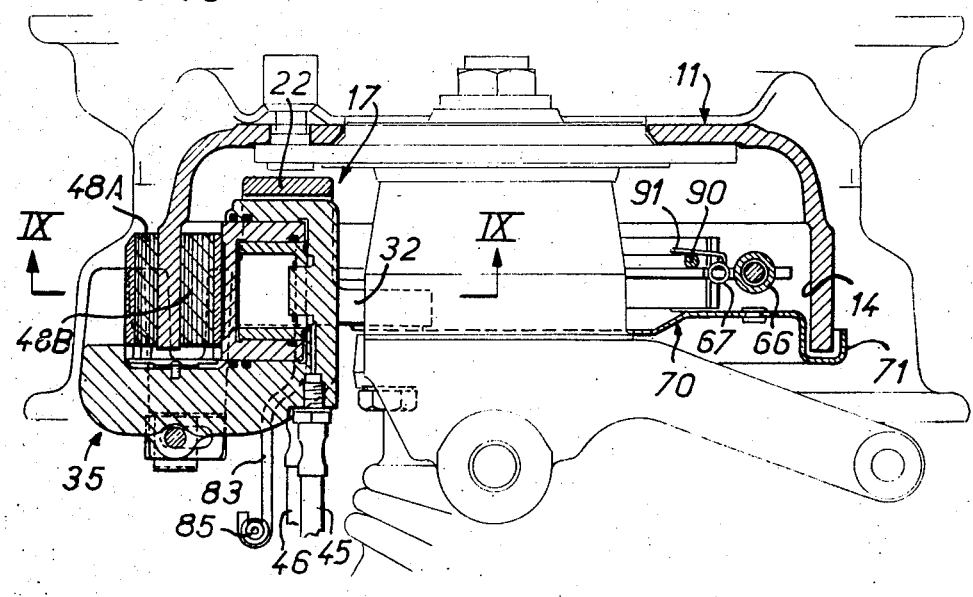
Figure 11:
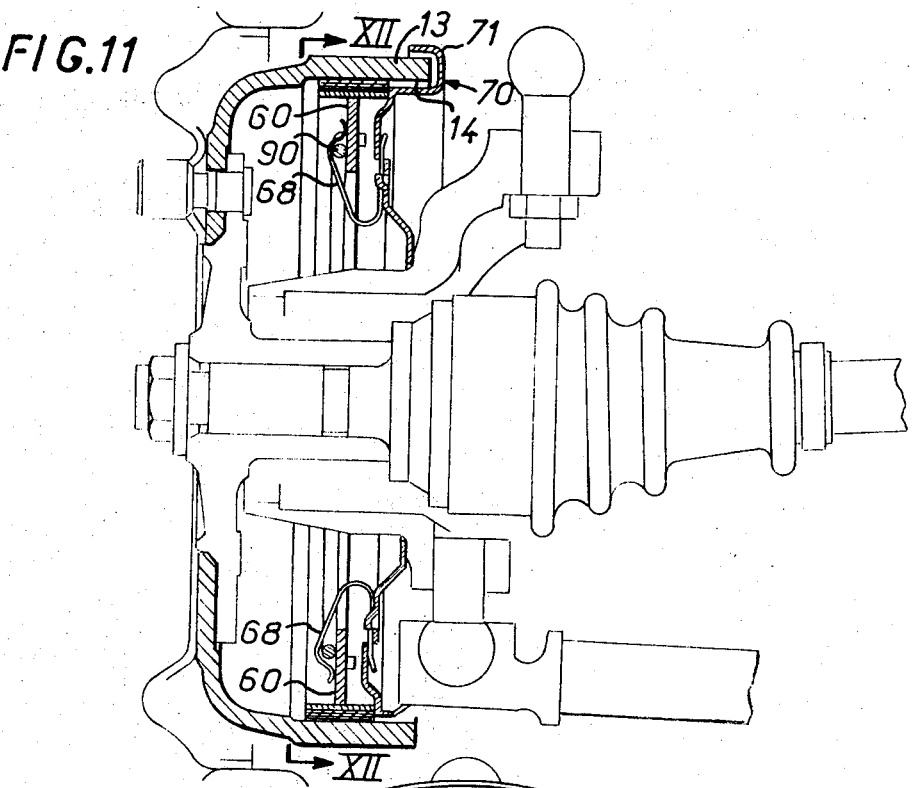

These legs 23 of hooked shape are extended by lugs or feet 24 having an elongated slot 25 (see FIGS. 2, 4 and 9) and provided with shoulders 26 (FIG. 8) facing each other.

On the other side of its central bar 22, with which are associated stiffening ribs 31 (FIG. 8), the support 17 comprises legs 32 pierced with passages 33 for fixing by screwing the associated member 18 of horseshoe shape.

The legs 32 terminate in forked members 34, the purpose of which will be explained later.

With the fixed support 17 there is first of all associated a stirrup 35 in the shape of a C. This stirrup is engaged on the ring 13 of the member to be braked, between the legs 23 and 32 of the support 17.

This stirrup 35 is further fixed to this support be means of a shaft 36 which passes on the one hand through the feet 24 of the support 17, and on the other hand through the lugs 37 of the stirrup 35, with the interposition at the end of elastic blades forming springs 38 supported at one extremity by the head 39 of the shaft 36 and at the other extremity by a nut 40 screwed on this shaft.

It will be noted that the elongated slots 25 of the support 17 are extended in substantially radial directions of the member 11 to be braked, that is to say along directions perpendicular to the axis of this member and parallel to the radius of this latter passing through the braking plates 48A, 48B described below, and that the shaft 36 extends perpendicularly on the one hand to this radial direction, and on the other hand to the shaft of the said member 11 to be braked.

That arm of the stirrup 35 which is inside the ring 13, and which is partly surrounded by the curved central portion 32 of the fixed support 17 forms a cylinder 41 for a piston 42 which is furthermore engaged on a sleeve 43 fixed on the stirrup 35, this piston 42 being closed by an end member 44 at its free extremity.

A first supply nozzle 45 communicates with the cylinder 41 inside the sleeve 43, while a second supply nozzle 46 communicates with the cylinder 41 outside the sleeve 43, between the edge of the piston 42 and the bottom of the said cylinder.

With the stirrup 35 are associated two braking plates 48A, 48B, arranged on each side of the ring 13, in order to co-operate respectively with the internal track 14 and with the external track 15 of this ring.

Figure 2:
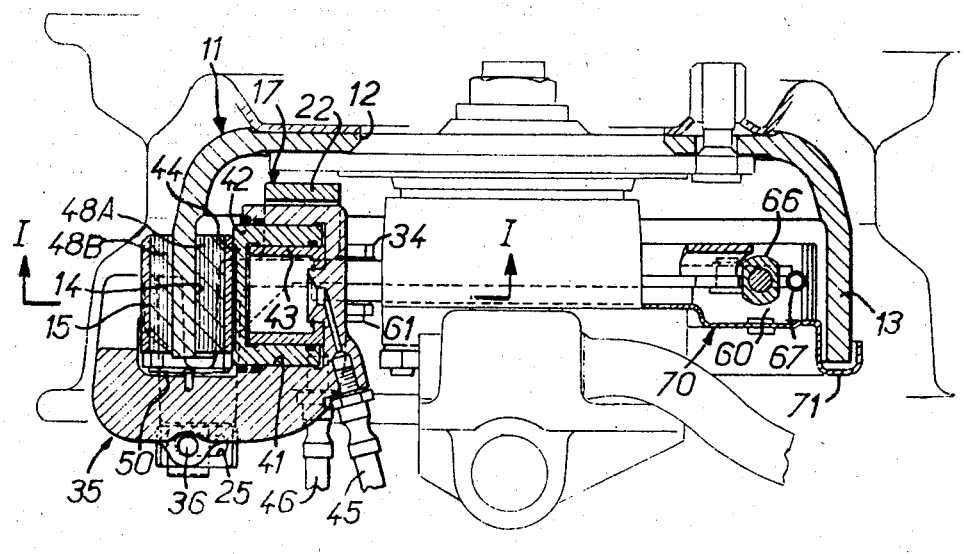
FIG. 2 is a view of this brake in cross-section taken along the line II—II of FIG. 1.

The braking plates 48A, 48B are provided laterally with shoulders 49 which come into contact with the shoulders 26 of the fixed support 17 for the maintenance of these plates parallel to the axis of the member 11 to be braked, in co-operation with a blade spring 50 fixed on the central arm of the stirrup 35, this spring urging the plates 48A, 48B into application against the shoulders 26 of the support 17 (see FIGS. 2 and 4).

As will be readily understood, the assembly which has just been described forms a brake with hydraulic operation, the arrival of oil under pressure through either of the supply nozzles 45, 46 permitting the piston 44 to act directly on the braking plate 48A, in order to apply the latter against the internal track 14 of the ring 13, and indirectly on the plate 48B, through the intermediary of the stirrup 35, for the application of the said plate against the external track 15 of the ring 13, for the clamping of this ring and thereby the braking of the member 11 of which it forms part.

The movement necessary for the stirrup 35 to follow this operation is rendered possible by its floating mounting on the support 17.

It will be noted that this mounting is not only sliding, by displacement parallel to itself of the shaft 36 in the slot 25 of the support 17, which enables the stirrup 35 to move radially with respect to the ring 13, but also pivotal by rotation about the shaft 36, which enables the stirrup 35 to follow any possible deformation of the ring 13 to a cone.

When the fluid pressure is released, the ring 13 is no longer clamped.

With the first braking means 16A described above there is associated a second braking means which has been given the general reference 16B on the drawings.

This second braking means 16B comprises two brake jaws 60 of the same type as the brake jaw of a drum brake, intended to co-operate with the internal track 14 of the ring 13 of the member 11 to be braked.

At one of their extremities, these two brake jaws 60 are each supported for articulation against the fixed support 17.

More precisely, a shaft 61 is engaged in each of the forked members 34 of this support 17, and each of the jaws 60 is articulated on this shaft by a notch having a complementary section.

Between the jaws 60 at their other extremities, there is further interposed an operating device 64, comprising a control lever 65 and a regulating device 66, in cooperation with a return spring 67 (see FIGS. 1, 2 and 6).

Figure 7:
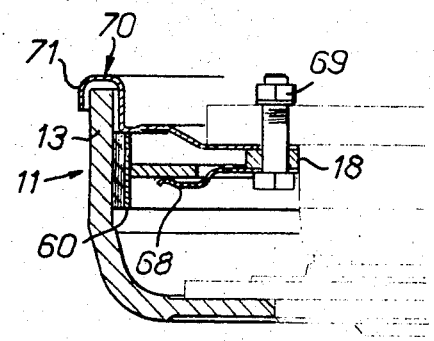
FIG. 7 is a partial view in cross-section taken along the line VII—VII of FIG. 6.

Springs 68 are rigidly fixed by screws 69 to the member 18 on which the fixed support 17 is secured (FIGS. 1, 6 and 7). They ensure the maintenance of the jaws 60 against an end-plate 70 which is fixed on the said member 18 by the same screws 69, on the other side of this member 18 with respect to the tongue 68, and which has a curved-back edge 71 engaged on the edge of the ring 13 of the member 11 to be braked (see FIGS. 2, 3 and 7).

In the usual manner, a tractive force applied on the control lever 65 in the direction of the arrow 75 of FIG. 1 and 76 of FIG. 6, ensures a distance apart of the jaws 60 with respect to each other, by pivotal movement about the shaft 61, until these jaws are applied against the internal track 14 of the ring 13, resulting in the braking of this latter.

As soon as the force on the control lever 65 is released, the spring 67 ensures the return of the jaws 60 to their initial positions.

In the preceding part of the description, the second braking means 16B is of the type in which the jaws 60 are continuously supported against the support 17 at one of their extremities, and are subjected to the action of their operating means at their other extremities.

During braking, one of these jaws is compressed, the reaction force of the ring 13 to the braking force being added for this jaw to the operating force which is applied to it; on the other hand, the other jaw is under tension, the reaction force of the ring 13 to the braking force being subtracted for this jaw from the operating force which is applied to it.

FIGS. 9 to 14 relate to the application of the invention to a brake of the type in which the jaws 60 are both compressed during a braking action.

In these FIGS. 9 to 14, elements similar to those described above have been given the same reference numbers as previously.

In particular, the jaws 60 are maintained at that of their extremities which is opposite to the fixed support 17, in abutment against a regulating member 66 by a spring 67.

Figure 12:
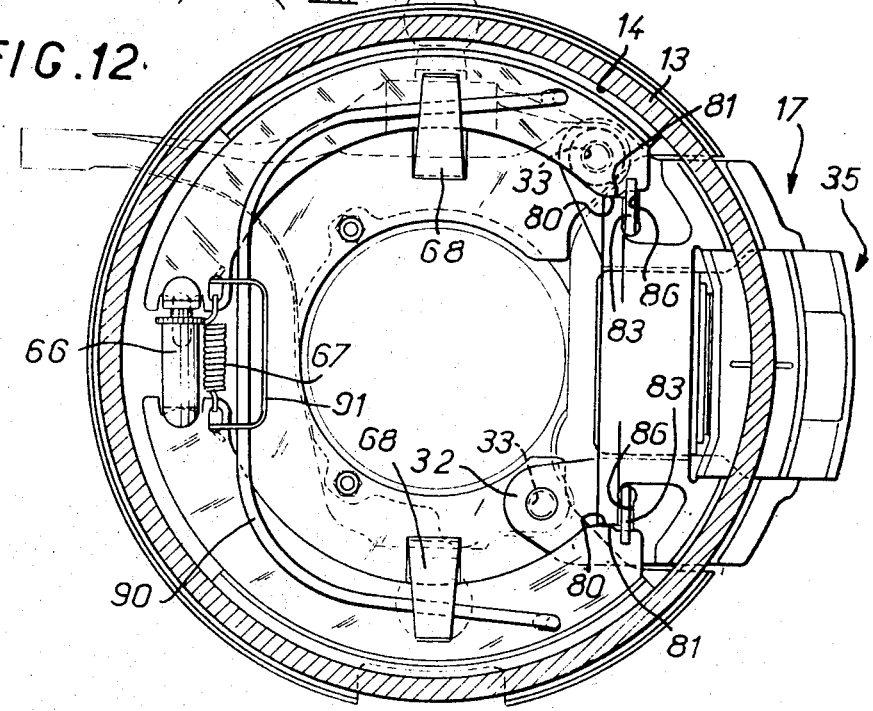
FIGS. 12 and 13 are views in cross-section of this alternative form, taken respectively along the line XII—XII of FIG. 11, and the line XIII—XIII of FIG. 9.
Figure 13:
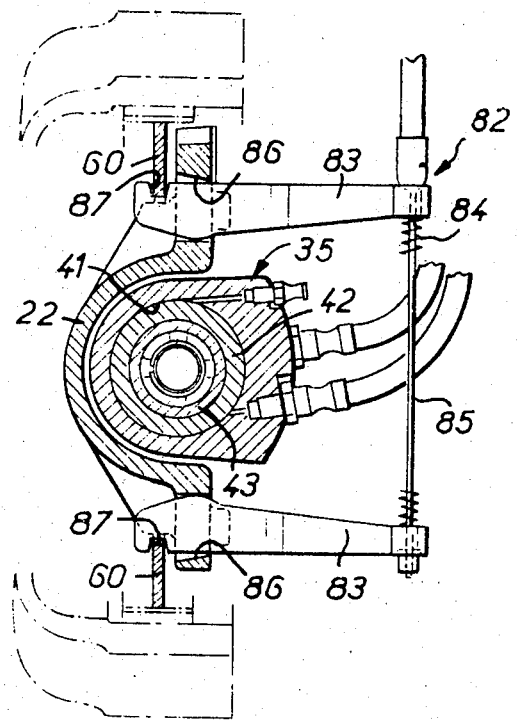
Figure 14:
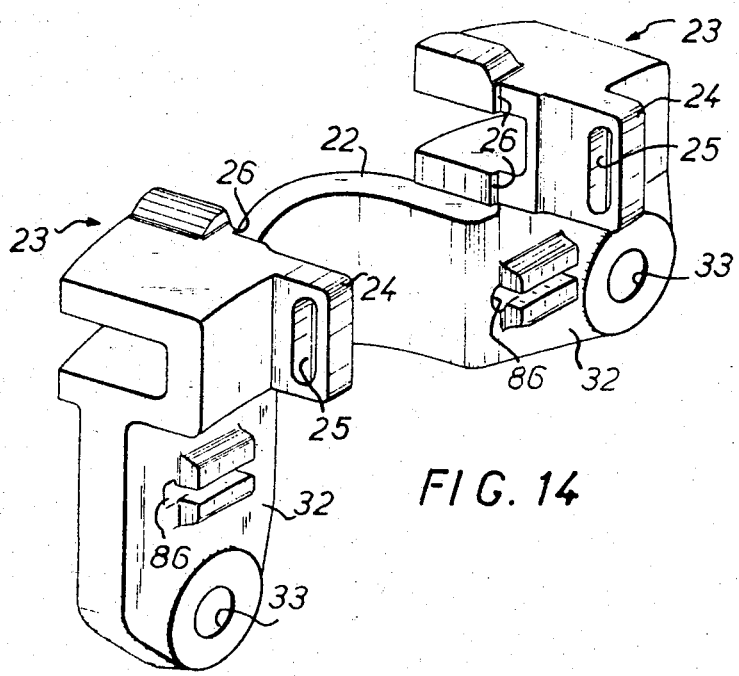
FIG. 14 is a view in perspective of the support utilized in this alternative form.

At their other extremities, these braking jaws comprise a supporting surface 80 intended to come into contact with an abutment 81 provided for that purpose on the fixed support 17 (see FIG. 12).

At this same extremity, the jaws 60 are acted upon by operating means 82 (FIG. 13), comprising two levers 83. At one of their extremities, these levers 83 are subjected as they move apart, to a spring 84, and as they move closer together, to a tension cable 85. In their central portion, they pass with support through passages 86 in the form of slots formed in the fixed support 17, and at their other extremity they are engaged by slots 87 on the jaws 60.

As will be readily understood, when a tensile force is applied on the cable 85, this latter brings the levers closer towards each other and these levers in their turn cause the jaws 60 to move away from each other. These jaws then become applied against the internal track 14 of the ring 13.

The two jaws 60, driven by the ring 13, are moved conjointly until the downstream jaw in the direction of rotation of the ring comes into contact with the corresponding abutment 81 on the fixed support 17. These two jaws 60 are therefore of the compressed type.

As soon as the tensile pull on the cable 85 is released, the spring 84 returns the levers 83 to their initial positions, thereby liberating the jaws 60.

These jaws are returned to their initial positions by a hoop-shaped spring 90, which is engaged on the stub-axle of the wheel to be braked.

This spring 90 is held in contact with the jaws 60, on the one hand by the spring 68 provided as before so as to maintain the jaws 60 against the protecting plate 70, and on the other hand by a hairpin spring 91, hooked on the jaws 60 at the extremities of these latter which are supported against the regulating device 66 (see FIG. 12).

Furthermore, in the example illustrated, the fixing of the support 17 to the member 18 is only provided on each of its legs 32 with one single passage 33, and these passages are arranged in an asymmetric manner on each side of the curved central bar 22.

It will of course be understood that the present invention is not limited to the forms of embodiment described and shown but includes all its alternative forms of construction.

In particular, the jaws 60 may bear against a different braking surface of the internal track of the ring 13 other than that which co-operates with the braking plate 48A, although this arrangement proves particularly advantageous, especially from the point of view of the general overall dimensions of the unit. In particular, these jaws could bear against the external track of the ring 13 or on a braking surface independent of this ring.

What we claim is:

1. A brake comprising a fixed support and a member to be braked, said member having a ring, said brake further comprising two braking plates arranged one on each side of said ring and a stirrup engaged on said plates and on said ring, means slidably and pivotally mounting said stirrup on said fixed support, said stirrup containing operating means that act directly on one of said plates and indirectly on the other of said plates through the intermediary of said stirrup, said fixed support being H-shaped and comprising two first legs in the form of a hook for engagement by said plates, said two first legs having shoulders to retain the braking plates, a spring supported against said stirrup to urge said plates into contact against said shoulders, said fixed support having a curved central bar and having two second legs having passages therethrough for the fixed securement of said support, two brake jaws bearing against said fixed support, a second operating means acting on said jaws to apply them against a braking surface formed on said member to be braked, said fixed support having two slots therethrough, said second operating means comprising a pair of levers passing through said slots and bearing pivotally on the edges of said slots and engaging said brake jaws.

2. A brake as claimed in claim 1, in which said stirrup is mounted on said fixed support by means of a shaft engaged on the one hand in at least one hole bored in said stirrup and on the other hand in at least one elongated slot formed in said fixed support, said elongated slot extending in a radial direction of the member to be braked, in a direction perpendicular to the axis of said ring and parallel to the radius of the ring passing through the centre of said braking plates, said shaft extending perpendicularly to this direction and to the axis of said member to be braked.

3. A brake as claimed in claim 1, in which the braking surface with which said brake jaws co-operate is formed by one of the tracks on said ring of the member to be braked, said track co-operating on the one hand with one of the braking plates and on the other hand with said brake jaws.

4. A brake as claimed in claim 3, in which one of said braking plates and the two said braking jaws are adapted to act on the internal track of said ring.

5. A brake as claimed in claim 1, in which the operating means for said braking plates is a hydraulic means, preferably with a double circuit.

6. A brake as claimed in claim 1, in which said two brake jaws are both of the type working under compression.

* * * * *